Oct. 24, 1967  J. T. PARSONS  3,349,157
METHOD OF MOLDING MULTI-LAMINATE AIRFOIL
STRUCTURES AND THE LIKE
Filed March 11, 1965
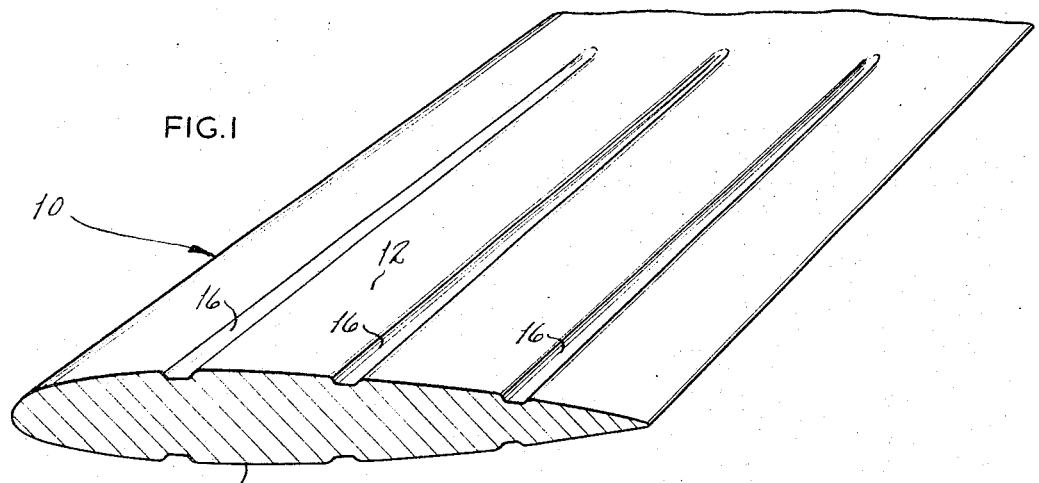
FIG.1
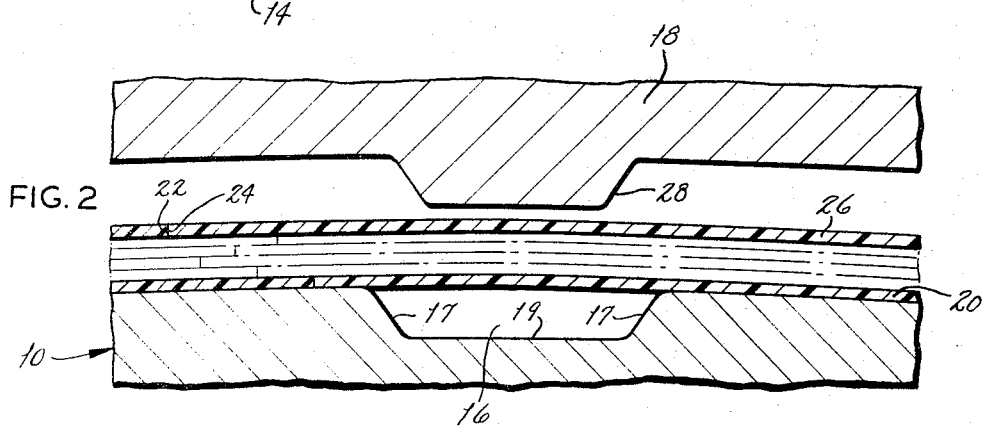
FIG.2
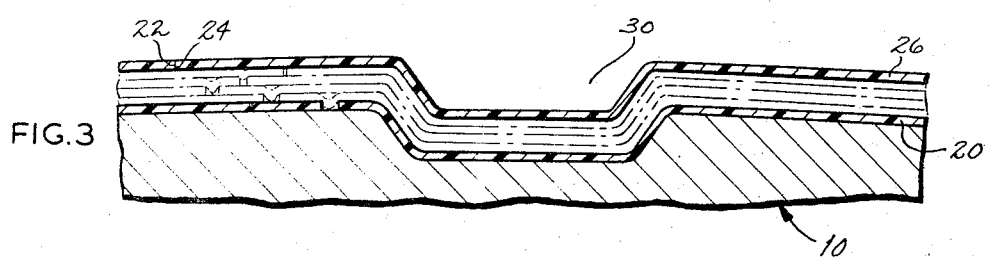
FIG.3
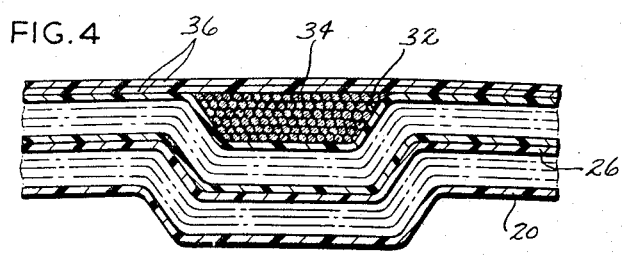
FIG.4
INVENTOR
JOHN T. PARSONS
BY
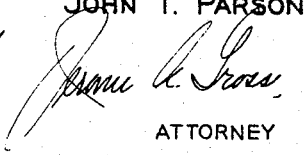
ATTORNEY 3,349,157
METHOD OF MOLDING MULTI-LAMINATE
AIRFOIL STRUCTURES AND THE LIKE
John T. Parsons, Traverse City, Mich., assignor to Parsons Corporation, Traverse City, Mich., a corporation of Michigan
Filed Mar. 11, 1965, Ser. No. 438,922
4 Claims. (Cl. 264—255)

The present invention relates generally to construction of airfoils and the like, and more particularly to a method of molding airfoils formed by wrapping a core with many laminae of glass-fiber-reinforced material which is impregnated prior to molding with plastic-like resin.

Characteristic of such pre-impregnated, glass-fiber-reinforced fabric is the thinning it undergoes when subjected to curing pressures and temperatures. This thinning is not accompanied by any substantial shortening of the fabric. Where a large number of laminae are being fused into an integral structure, thinning of each of the laminae effects inward shrinkage to such an extent that the laminae, more than a few layers removed from the core, acquire excess peripheral length. Compression in the mold of those laminae exhibiting such excess peripheral length may result in the formation of undesired and unaccepable wrinkles. Such a result defeats the purpose of using such glass-fiber fabric material for its strength in tension.

The general purpose of this invention is to provide a method of molding airfoils and airfoil structures which satisfactorily overcomes the problem of wrinkles developing where a large number of laminae of flexible fabric material impregnated with plastic resin are used in the construction.

Specifically, among the objects of the present invention is the provision of a method of molding airfoil structures wherein a large number of laminae of permeable flexible material impregnated with plastic are:

So pressed during molding as to take up all excess peripheral length which results from such thinning, thus to prevent the formation of wrinkles in the structure; and Maintained with the edges of the outermost laminate aligned with respect to each other in a predetermined alignment.

A further object is to provide a method of molding a wrinkle-free airfoil consisting of a plurality of lay-ups of impregnated flexible material having reinforcements in the spanwise direction.

These purposes and others apparent herein are achieved generally by laying up and around the surface of a spanwise-grooved core a plurality of laminae of plastic-impregnated permeable flexible material. Such material may be Fiberglas cloth or other material characterized by its strength in tension. When so impregnated, it is further characterized by its propensity to become thinned upon curing. The laminae which are laid-up about the spanwise-grooved core are pressure-molded as a unit in a suitable mold. As the laid-up laminae become thinned, they shrink inwardly toward the core. In order to take up that excess peripheral length of the laminae which results from such thinning, portions of the wrapped laminae are simultaneously pressed inward into each groove of the core. In this process of molding, the laid-up flexible material is held unwrinkled despite such inward shrinkage and the accompanying excess peripheral length; and a spanwise-grooved molded structure is thus formed upon the core.

Numerous laminae or plies may be thus laid up in a single application. Nevertheless, the total number of plies required may be so great that a curing problem would result if all were laid up at one time. In the present invention, the number of laminae laid up in a first molding step may be limited as desired; the grooved, molded lay-up is then itself used as a core for molding thereupon a second lay-up of laminae, which are then pressed and cured in the same manner.

For aerodynamic purposes it is desirable to eliminate the grooves so formed in the outer surface of the molded structure. Therefore the grooves are filled with plastic and longitudinal fibrous material and covered by laying up an airfoil cover sheet on the outer surface so filled. The lay-up which results is then subjected to pressure-molding to form a wrinkle-free airfoil, wherein the added longitudinal fibrous material serves to strengthen and reinforce the airfoil.

Utilization of the present invention will become apparent to those skilled in the art from the disclosures made in the following description of the invention as illustrated in the accompanying drawings, in which:

FIG. 1 is a partial perspective sketch of a spanwise-grooved core for use in practicing the present invention;

FIG. 2 is an enlarged partial section of the core of FIG. 1 wrapped with a plurality of laminae of flexible sheet material, impregnated with molding resin, a portion of a mating female mold member being shown thereabove;

FIG. 3 is an enlarged partial sketch of the core and the spanwise-grooved molded material shown after it has been cured and the mating mold member removed; and FIG. 4 is an enlarged partial sketch of the cured material of FIG. 3 wrapped with an outer lay-up of similar impregnated sheet material, similarly molded to provide grooves at the outer surface, which grooves have then been filled and covered.

Referring now to the drawings, wherein like reference characters designate like or corresponding parts throughout the several views, there is shown in FIG. 1 a molding core 10, used for laying up individual sheets of resin impregnated glass fiber material which are to be molded into an integral structure. Preferably the core 10 is made by casting a low melting point tin-lead alloy into the configuration of an airfoil element, which determines the internal dimensions of a hollow airfoil to be molded thereabout. Extending spanwise along upper and lower surfaces 12 and 14 of the core 10 are a plurality of shallow grooves generally designated 16 defined by sloping walls 17 which meet at the groove bottom 19, recessed from the outer contour of the core 10 by the depth of the grooves 16. In the core illustrated, six grooves 16 are shown; three of the grooves 16 being formed along the upper surface 12 and three being formed along the lower surface 14.

In FIG. 2 there is shown a portion of the female mold part 18 which mates with one of the grooves 16 of the core 10. The female mold (not shown in full) conventionally consists of an upper and a lower mold part fastenable together so that the wrapped core 10, between the two female mold parts, may be subjected to molding pressures and temperatures, by conventional means not shown in the drawing.

In practicing the present invention, a first uncured sheet 20 of permeable flexible sheet material is laid-up and around the spanwise-grooved core 10. The sheet material is preferably comprised of glass fibers, woven and pre-impregnated with a heat-curable plastic resin. Such pre-impregnated sheets are commercially available and are characterized by their strength in tension, as well as their propensity to become thinned upon curing under heat and pressure. For example, a single sheet of such preimpregnated material nominally .013 in. thick will become thinned during the curing operation to .011 inch.

Additional sheets of such material are laid-up over the first applied sheet 20, each sheet covering the previously wrapped one so that a plurality of uncured laminae is built up upon the core 10. Preferably the sheets are pre-cut to specified lengths so that the spanwise-extending edges of each laminate abut in alignment with each other when they are laid-up on the core 10, but the locations of such abutting edges of adjacent laminae are staggered from each other; see FIG. 2. Particular care is taken to align the spanwise-extending edges 22, 24, of the outermost sheet 26.

It has been found that in utilizing the present invention, thirty or more laminae of the curable sheet material may be wrapped around the core 10 and cured in a single curing operation. Since each laminate is pre-cut to a length sufficient to cover the laminae about which it is wrapped, the thirtieth or outermost laminae 26 is considerably longer than the innermost laminae 20. Thinning of each of such thirty laminae upon curing is unaccompanied by any lengthwise shrinkage of the sheet material. As a result of the thinning of the laminae, each laminate outside the first one adjacent to the grooved core 10 acquires excess peripheral length. This excess length is especially substantial in the outer laminae and, if not taken up, is likely to result in wrinkles, molded into the structure. A problem of the present invention therefore is to "de-bulk" the material without causing such wrinkles.

To cure the laid-up laminae without developing such wrinkles, the wrapped core 10 is placed into the female mold as shown partially in FIG. 2. Inward projections 28 extend spanwise along the inner surfaces of the mold parts 18, each in registration with a mating groove 16 of the core 10. When the two mold parts are secured together, the projections 28 register with and extend into the grooves 16 of the core 10. After the mold parts are secured, heat and pressure are aplied, and the wrapped laminae become thinned as they are cured. Each mold part projection 28 presses a portion of the wrapped laminae downward into the groove 16, sufficiently to take up the excess peripheral length resulting from such thinning of each laminate. The depth of the grooves 16 is so precisely chosen, with reference to the number of laminates to be so "de-bulked," that the alignment of the spanwise-extending edges 22, 24 of the outermost sheet 26 is maintained, as shown in FIG. 3.

After the curing operation, the molded and cured laminae and the core 10 are removed from the pressure-mold. As is shown in FIG. 3, the outer surface of this cured lay-up has grooves 30 which correspond to the grooves 16 of the core 10. Thus the initial lay-up of wrapped laminae, when molded and cured, has a plurality of groves 30 which may be used for subsequent lay-ups to remove the excess peripheral length resulting when they are likewise cured.

Additional lay-ups may be formed upon the first cured lay-up by wrapping a plurality of similarly impregnated sheet material about the spanwise-grooved first cured lay-up. The additional lay-up may then be pressure-molded in a substantially similar female mold whose mold cavity has the requisite greater outer dimension, likewise provided with projections similar to the projections 28, which press and mold sufficient portions of the additional lay-up laminae inwardly into the grooves 30 of the molded structure; and the outer surface of the molded article at this stage has similar grooves 32, of substantially the same depth as the grooves 30 but of lesser chordwise extent. In this manner the excess peripheral length of the laminae of the second lay-up is taken up, so that the resulting spanwise-grooved molded article is wrinkle-free.

The outermost lay-up grooves 32 may then be filled with longitudinal fibers of glass and plastic resin to form reinforcements 34 as shown in FIG. 4. After the grooves 32 are filled, one or two cover sheets 36 of preimpregnated glass fiber material may be wrapped around. The entire wrapped structure may then be subjected to pressure-molding and cured, thus completing the wrinkle-free airfoil having spanwise reinforcements 34. Since only a few of such cover sheets 36 are used, the total thinning and inward shrinkage of such few sheets is negligible, and there is little tendency for excess peripheral length or wrinkles to develop.

When the airfoil structure has thus been completely laid up and formed, a final heating (which may complete the heat-curing) serves to melt the core 10, which is then poured out, leaving the completed airfoil.

The exothermic reactions of certain molding resins on curing, may limit the number of laminae which feasibly can be molded and cured at a time. With the present invention depending upon the thickness desired for the molded article, there may be a succession of lay-up and molding steps as described. Each lay-up is provided with grooves by which the excess length of its laminates, developed on "de-bulking," is taken up; and which thereafter serve as the grooved core for the next lay-up. Thus the present invention eliniates "de-bulking" and wrinkling as limiting factors in determining how many laminates are to be molded at a time.

Obviously, modifications and variations of the present invention are possible in view of the above teaching. It is therefore to be understood that, within the scope of the appended claims, the invention may be practiced otherwise than as specifically described.

I claim:

1. The method of molding airfoil structures and the like, comprising the steps of
   laying up upon and around the surface of a spanwise-grooved core a plurality of laminae of permeable flexible material characterized by strength in tension and pre-impregnated with plastic and together characterized by being thinned upon molding,
   pressure-molding the laid-up laminae about the core, whereby the laid-up laminae shrink inwardly toward the core as they become thinned, and
   simultaneously pressing sufficient portions of the wrapped laminae inward into each groove of the core to take up that excess peripheral length of the laminae which results from such thinning, thereby holding all the flexible material unwrinkled despite such inward shrinkage,
   whereby to form upon such core a spanwise-grooved molded structure.

2. The method of molding airfoil structures as defined in claim 1, further comprising the steps of
   further comprising the steps of
   laying up additional laminae of similar impregnated material on the surface of the grooved molded structure so formed,
   pressure-molding the additional laid-up laminae about said molded structure, whereby such additional laid-up laminae shrink inwardly, and
   simultaneously pressing sufficient portions of the additional laid-up laminae inwardly into each groove of the molded structure to take up that excess peripheral length of the laminae which results from their thinning.

3. The method of molding airfoils comprising the steps of molding a structure as defined in claim 2, together with the further steps of
   filling each groove so formed in the outer surface of the molded structure with plastic and fibrous material,
   laying up an airfoil cover sheet on the outer surface so filled, and
   pressure-molding said lay-up whereby to form a wrinkle-free molded airfoil having spanwise reinforcements.

4. The method of molding airfoil structures and the like, comprising the steps of
   laying up upon and around the surface of a spanwise-grooved core a plurality of laminae of permeable flexible material characterized by strength in tension and pre-impregnated with plastic and together characterized by being thinned on molding,
   aligning the spanwise-extending edges of the outermost laminate of said lay-up with respect to each other in a predetermined alignment, pressure-molding the laid-up laminae about the core, whereby the laid-up laminae shrink inwardly toward the core as they become thinned, and simultaneously pressing sufficient portions of the wrapped laminae inward into each groove of the core to take up that excess peripheral length of the outermost laminate which results from such thinning, thereby maintaining its edges in said predetermined alignment and holding all the flexible material unwrinkled despite such inward shrinkage, whereby to form upon such core a spanwise-grooved molded structure.

References Cited

UNITED STATES PATENTS

| | | | |
|---|---|---|---|
| 2,315,394 | 3/1943 | Brosius | 244—123 X |
| 2,451,131 | 10/1948 | Vidal et al. | 244—123 X |
| 3,028,292 | 4/1962 | Hinds | 244—123 X |
| 3,123,509 | 3/1964 | Toegel | 156—191 |
| 3,212,948 | 10/1965 | McMahon | 156—222 |

ROBERT F. WHITE, *Primary Examiner.*

T. J. CARVIS, *Assistant Examiner.*